US010005265B2

(12) United States Patent
Hecht

(10) Patent No.: US 10,005,265 B2
(45) Date of Patent: Jun. 26, 2018

(54) LAYERED BORDER FOR TOUCH SENSOR DEVICE

(71) Applicant: ELO TOUCH SOLUTIONS, INC., Milpitas, CA (US)

(72) Inventor: David S. Hecht, San Carlos, CA (US)

(73) Assignee: Elo Touch Solutions, Inc., Milpitas, CA (US)

( * ) Notice: Subject to any disclaimer, the term of this patent is extended or adjusted under 35 U.S.C. 154(b) by 133 days.

(21) Appl. No.: 14/182,059

(22) Filed: Feb. 17, 2014

(65) Prior Publication Data

US 2014/0158298 A1 Jun. 12, 2014

Related U.S. Application Data

(62) Division of application No. 13/418,035, filed on Mar. 12, 2012, now Pat. No. 8,692,812.

(51) Int. Cl.
*B32B 37/02* (2006.01)
*G06F 3/043* (2006.01)
*B05D 1/02* (2006.01)
*B05D 3/02* (2006.01)

(52) U.S. Cl.
CPC ............... *B32B 37/02* (2013.01); *B05D 1/02* (2013.01); *B05D 3/0254* (2013.01); *G06F 3/0436* (2013.01)

(58) Field of Classification Search
CPC ...... G06F 3/043; G06F 3/0436; G06F 3/0433; G06F 3/041; G06F 3/046; G06F 3/044
USPC .................. 427/108; 345/177, 173
See application file for complete search history.

(56) References Cited

U.S. PATENT DOCUMENTS

| 6,502,979 B1 | 1/2003 | Kozyuk |
| 6,589,501 B2 | 7/2003 | Moser et al. |
| 2005/0012724 A1* | 1/2005 | Kent ............... G06F 3/0418 345/177 |
| 2007/0013679 A1* | 1/2007 | Gruhlke ............ G06F 3/03547 345/175 |
| 2009/0159345 A1* | 6/2009 | Kobayashi ........... G02F 1/1354 178/18.09 |
| 2011/0234545 A1* | 9/2011 | Tanaka ................. G06F 3/0436 345/177 |
| 2011/0273906 A1* | 11/2011 | Nichol ................ G02B 6/0076 362/607 |
| 2013/0047420 A1* | 2/2013 | Ra ..................... G06F 3/041 29/622 |

(Continued)

OTHER PUBLICATIONS

International Search Report and Written Opinion for Application No. PCT/US2013/024102 dated Jun. 20, 2013.

(Continued)

*Primary Examiner* — Tabassom Tadayyon Eslami
(74) *Attorney, Agent, or Firm* — Sterne, Kessler, Goldstein & Fox P.L.L.C.

(57) ABSTRACT

Multi-layered paint on a border of a surface acoustic wave touch device may reduce attenuation. The touch substrate has a front surface and a back surface where the front surface has a touch region. Multi-layered paint is formed on the back surface to form a border along the touch substrate. The multi-layered paint includes a mirror layer and a color layer. The surface acoustic waves propagate over at least a portion of the border region such that the surface acoustic waves propagate on the multi-layered paint without excessive wave attenuation.

15 Claims, 2 Drawing Sheets

(56) References Cited

U.S. PATENT DOCUMENTS

| | | | |
|---|---|---|---|
| 2013/0047428 A1* | 2/2013 | Ra | G06F 3/041 29/846 |
| 2013/0093730 A1 | 4/2013 | Scharff et al. | |
| 2013/0120323 A1 | 5/2013 | Scharff | |
| 2013/0234994 A1 | 9/2013 | Hecht et al. | |

OTHER PUBLICATIONS

Widivandari, H. et al., *Production of Narrow-Size-Distribution Polymer-Pigment-Nanoparticle Composites via Electrohydrodynamic Atomization*, Macromol. Mater. Eng. 292 (2007) 495-502.

Noval Glass, "Aluminum mirror with white paint," http://alibaba.com/product-gs/385318256/Aluminum_mirror_with_white_paint.html. Printed Jan. 12, 2012.

Tyco Electronics, "iTouch Surface Acoustic Wave Touch Technology Specification," http://www.elotouch.com/Technologies/ITouch/specifications. Printed Jan. 12, 2012.

Millian, M., CNN Tech, "Why Apple Can can make a white iPad but not a white iPhone", http://articles.cnn.com/2011-03-03/tech/apple.white.ipad_1_iphone-model-3gs-new-tablet-computer?_s=PM:TECH. Mar. 3, 2011, Printed Mar. 12, 2012.

\* cited by examiner

LAYERED BORDER FOR TOUCH SENSOR DEVICE

CROSS-REFERENCE TO RELATED APPLICATION

This application is a divisional of U.S. patent application Ser. No. 13/418,035, entitled "Layered Border For Touch Sensor Device," filed Mar. 12, 2012, which is incorporated by reference herein in its entirety.

BACKGROUND

Touch sensors detect touch, such as from a user's finger, a stylus, or some other device. Touch sensors may be transparent or opaque input devices for computers or other electronic systems. A transparent touch sensor, such as a touch screen, may be used in conjunction with a display device. Touch displays are increasingly used in commercial and consumer applications, such as cellular phones, restaurant order entry systems, industrial process control applications, interactive museum exhibits, public information kiosks, pagers, computers, personal digital assistants, and video games.

Acoustic-based sensors may be used to detect touch. Certain types of acoustic touch screens, also known as ultrasonic touch screens, detect touch with high transparency and high resolution, while providing a durable touch surface such as a glass touch substrate. Of particular commercial interest are ultrasonic touch screens using surface acoustic waves.

A border, bezel, or other edging may be used to block a user's view of electronics and components within a touch sensor device. For a transparent touch screen, paint may be used on a back side of the touch substrate as the border. For acoustic touch sensor devices having electronics and components on the back side of the touch substrate, the border paint may undesirably attenuate the surface acoustic waves. Thicker paint on the border area of the touch substrate tends to more greatly attenuate the surface acoustic waves, resulting in decreased signal-to-noise ratio and more likely incorrect touch detection. Thicker paint also decreases the surface acoustic wave velocity, which may not be desirable. Some paint colors may be more opaque than others, allowing for thinner paint layers. White paint is not such a paint color, and obtaining optical density greater than about 1.0 for white paint is difficult without using a thick layer. To sufficiently block light, a thick layer of white paint (or multiple coats of white paint) is needed in contrast with the thickness needed with black paint. As mentioned, the thicker paint border layer is undesired. However, a certain level of opacity is sometimes necessary, for example especially for applications that are backlit.

SUMMARY

In a first aspect, a surface acoustic wave touch device includes a touch substrate having a front surface and a back surface. The front surface is facing a user of the device. The device includes a multi-layered paint stack on a border region formed on the back surface. The multi-layered paint stack includes a reflective layer and a color layer. A transducer is provided for generating surface acoustic waves propagating on the front surface, the surface acoustic waves propagating over at least a portion of the border region such that the surface acoustic waves propagate on the multi-layered paint stack.

In a second aspect, a method is provided for forming a surface acoustic wave touch device. The method includes steps of forming a stack of reflective material and cosmetic material on a touch substrate, and positioning a source of surface acoustic waves to propagate the surface acoustic waves on the stack and over the touch substrate in a desired pattern.

In a third aspect, a touch sensor is provided. The touch sensor includes a touch substrate has a region, a first coating at the region, and a second coating at the region. The first coating comprises a reflective coating and the second coating comprises a color coating, the reflective coating being non-white.

The present invention is defined by the appended claims. Further aspects and advantages of the invention are discussed below in conjunction with the preferred embodiments and may be later claimed independently or in combination.

BRIEF DESCRIPTION OF THE DRAWINGS

The components and the figures are not necessarily shown to scale, as emphasis is being placed upon illustrating the principles of the invention. Moreover, in the figures, like reference numerals designate corresponding parts throughout the different views.

DETAILED DESCRIPTION OF SPECIFIC EMBODIMENTS

A surface acoustic wave touch screen, or other touch device, has paint or ink in a border area. To provide a white or other lighter color border area with similar opacity as black color paint or to cosmetically block a view of components beyond the border, two layers of paint or ink are provided, according to a specific embodiment of the invention. The two layers include one layer that is a reflective material such as a mirror ink, and another layer that is a white paint. The overall thickness of the paint stack may be thinner than providing a similar opacity with just the white paint layer. This stack may cause less surface acoustic wave attenuation than a thicker layer of just the white paint. By being thinner, this stack may also reduce the stress of the glass as compared with a thicker layer of only white paint. Also, the thinner stack may use less material and therefore cost less. The mirror ink has more opacity per unit thickness than white ink. A broadband reflector, such as a mirror ink, may impart limited additional color to a light color such as white but increase the level of opacity. The mirror ink may affect the perceived color of the white paint (or other light color paint in other embodiments) less than if a layer of black or gray paint were used under the white paint (or other light color paint).

Figure 1:
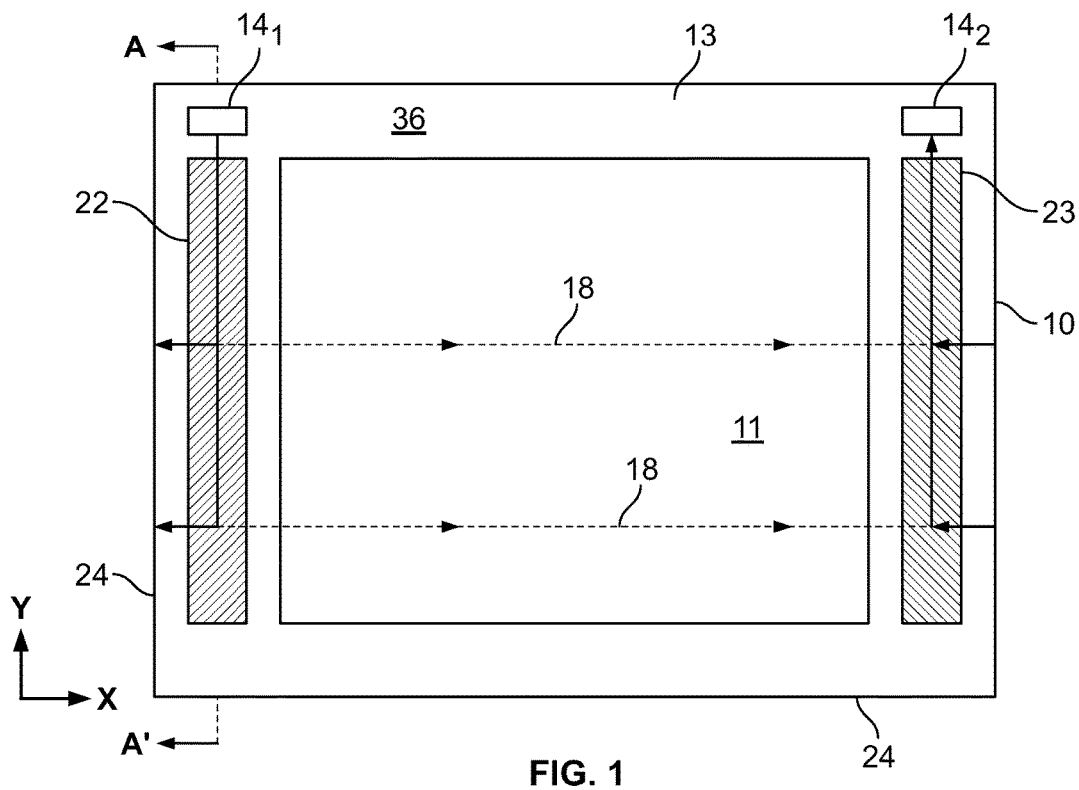
FIG. 1 is an example general diagram in top view of a touch substrate with a border.
Figure 2:
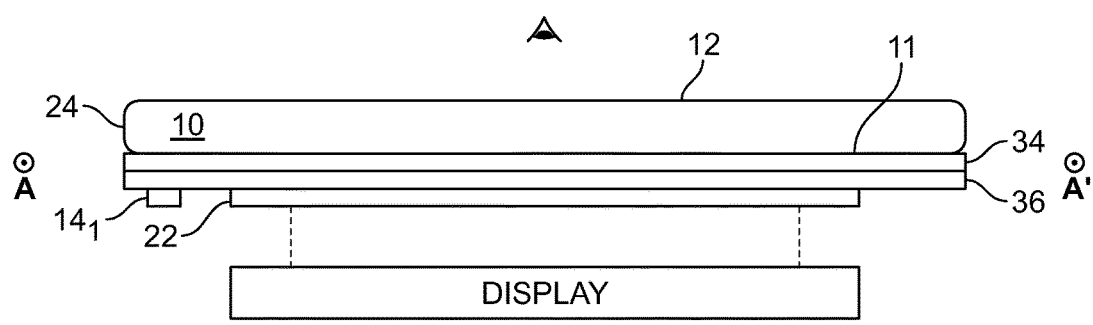
FIG. 2 is a cross-sectional view of the example touch substrate and border of FIG. 1, according to a specific embodiment.

FIG. 1 shows an example general plan view diagram of a back side or back surface 11 (the back side being that closest to the display positioned behind the touch substrate 10) of a touch sensor arrangement for a surface acoustic wave touch device. FIG. 2 shows a cross-sectional view of FIG. 1 at A-A'. The touch sensor layout described herein is for a touch screen utilizing a semi-transparent or transparent touch substrate 10 through which a display is provided behind the touch substrate. Displays being typically rectangular, touch screens also are typically rectangular, but any shape may be used.

In general, a surface acoustic wave touch screen includes a substrate 10 on which the surface acoustic waves propagate. X and Y transducers 14 generate surface acoustic waves 18 along perpendicular axes. Transmit reflective arrays 22 proximate the edges of the touch substrate 10 and spaced along the axes reflect the transmitted surface acoustic waves 18 across the touch screen's front surface 12 along perpendicular paths. Receive reflective arrays proximate the edges of the touch substrate and spaced along opposite sides from the transmit reflective arrays 22 reflect the surface acoustic waves 18 that have propagated across the front surface to X and Y receive transducers. Only one transmit transducer $14_1$ and transmit reflective array 22 and corresponding receive reflective array 23 and receive transducer 14 in the border area 13 are shown for simplicity of description (the other axis' transmit and receive transducers 14 and transmit and receive reflective arrays which are not shown would be proximate the top and bottom edges of substrate 10 in the border area 13). Transmit transducer $14_1$ generates the acoustic waves 18 traveling in a linear direction that partially pass through the linear transmit reflective array 22 and partially are reflected by the linear reflective array 22 in a direction normal to the linear direction and toward the curved connecting surface 24 of substrate 10. The waves then travel across the front surface 12 of substrate 10 to travel around the curved connecting surface 24 on the opposite edge to the back side 11 to receive reflective array 23 which then re-directs the waves to receive transducer $14_2$. When a touch occurs on the front surface 12, the touch causes attenuation of the surface acoustic waves 18 at corresponding locations along the two axes, X and Y. The X, Y touch position is determined based on the timing of the attenuation in the signal received at the receive transducers. U.S. Published Patent Application 2011/0234545, incorporated by reference for all purposes, describes in more detail the operation and function of such a surface acoustic wave touch sensor. Other arrangements, such as using radial transducers and corresponding propagation paths and reflectors (such as described in detail in U.S. patent application Ser. No. 13/296,953 which is incorporated by reference for all purposes), may be used in other embodiments.

FIG. 1 represents the surface acoustic waves 18 as rays. Such ray tracing is an approximation of acoustic wave propagation. A complete understanding of various second order effects in the design and use of radial surface acoustic waves may extend beyond the ray tracing approximation. Much of the context of discussion and the figures show the rays or surface acoustic waves propagating away from the acoustic wave generator $14_1$, representing transmission or transmit operation. Of course, the same or similar transducer design or layout may be used in a receive mode (that is, the transmit transducer and receive transducer and the respective reflective arrays may switch roles and the direction of the arrows or rays is reversed).

The front surface 12 is the surface of a substrate 10, such as a glass plate in a specific embodiment. Other transparent or semi-transparent materials may be used. The touch substrate 10 is smooth, flat, or gently curved to allow propagation of surface acoustic waves thereon. The touch substrate 10 is free of bumps, divots, ridges, or other structures interfering with propagation of surface acoustic waves. In some embodiments, coversheets may be used on the front surface of the substrate to form a composite substrate structure of a SAW absorbing coversheet, a small separating air gap that is eliminated at the location of a touch, and a substrate capable of propagating surface acoustic waves. In alternative embodiments, such composite structures are to be construed as the "touch substrate" for purposes of the invention.

As shown in FIGS. 1 and 2, the touch substrate 10 is a flat slab or substrate with a rectangular shape. Other shapes may be provided, such as circular, square, triangular, or irregular in other embodiments. Rather than being flat, the top 20 and/or bottom 22 may be curved, wavy, or other non-flat shape. For example, the front surface 12 is on a hemisphere or other track ball or mouse shape. A uniform or non-uniform thickness substrate is used, provided the thickness of substrate 10 is several times greater than the wavelength of the propagating surface acoustic wave.

According to a specific embodiment, the connecting surface 24 is along the entire periphery of substrate 10 connects the front and back surfaces 12, 11. In some embodiments, the connecting surface 24 may be only be on some edges of the substrate with other opposing edges of the substrate being flat to reflect acoustic waves at 180 degrees without using a separate receive reflective array and a separate receive transducer (that is, a transducer and reflective array could be used as both transmit and receive purposes). Generally, the curved connecting surface 24 is rounded without any ridges or sudden transitions so that surface acoustic waves 18 may travel from the back surface 11 to the front surface 12. As another example, the connecting surface 24 may have a corner or other sharp transition with the front surface 12 to reflect surface acoustic waves. Different portions of the connecting surface 24 may have different characteristics, such as a corner or ends being rounded or flat and the rest of the connecting surface 24 being the other of flat or rounded.

With acoustic transducer and reflective arrays positioned on the back surface 11, there is no need for an external bezel to protect the perimeter of the front surface 12 of the substrate, thus enabling zero-bezel surface acoustic wave touch product designs.

The substrate 10 includes a border region 13. The border 13 is a region of any shape and size but typically provides a frame along the periphery of front surface 12 so as to cover the acoustic components discussed above. In one embodiment, the border 21 is about 1 cm or less in width around the entire top and/or bottom surface 20. The components are not shown to scale in the figures, and the transducer sizes and array widths are exaggerated relative to the dimensions of the touch substrate for clarity. The transducer and arrays may be on a 20 mm or less margin of the touch sensor. The border 13 is distinguished from the display region or other portions of the substrate 10 by treatment, color, or other cosmetic difference. For a touch screen, the border 13 preferably is on back surface 11 and may be a painted periphery region surrounding a display area. In one embodiment, the border 13 is formed by opaque material. In other embodiments, the material defining the border 21 may be on the front surface 12 or both the front and back surfaces 12, 11.

Where the substrate 10 is transparent or semi-transparent, the border 13 blocks or partially blocks light. By blocking light, a user may not be able to view electronics/components positioned behind the border 13. For example, a display is positioned behind the back surface 11. Brackets and/or controller electronics (not shown) are positioned behind the border 13. The opacity of the border 13 prevents the user from seeing the brackets holding the display or the electronics/components. The electronics/components may include acoustic components of the touch sensor, controller and wires/cables for the touch screen and display or other portions of the device.

Figure 5:
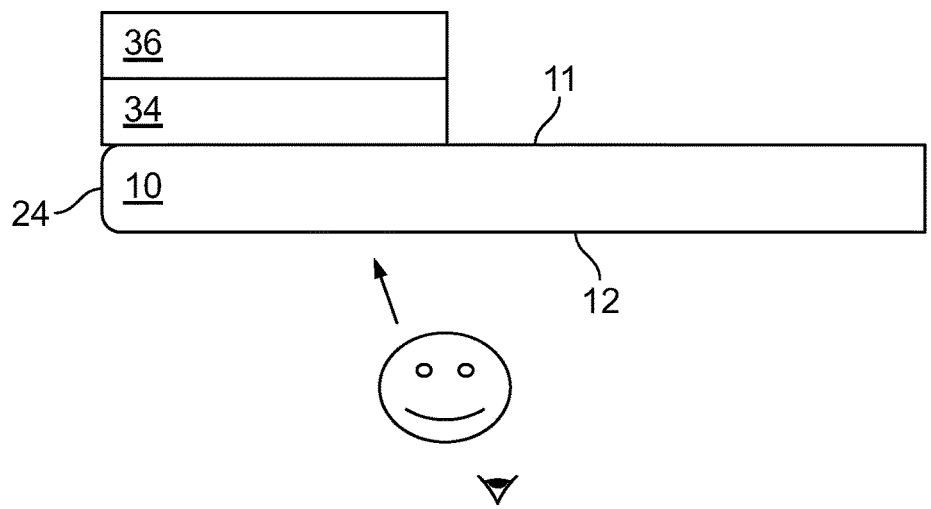
FIG. 5 is a cross-sectional view of multiple paint layers on a border region of a touch substrate, according to one example.

Portions of the border may be transparent or semi-transparent. For example, one or more icons or symbols may be etched or formed through the opaque border material, such as shown in FIG. 5. A light emitting diode or other light source is positioned adjacent to the icon (shown for example as a smiling face icon) for lighting the icon formed on the border. The opaque border may prevent any light halo from shining through to the user, except where the light transparent portions in the opaque border exist.

According to a specific embodiment of the invention, the border 13 is formed by multi-layered material having at least layers 34 and 36. In addition to layers 34 and 36, additional layers may be provided in some embodiments. The layers 34, 36 are shown with a same width, such as a width defining the border 21. The layers 34, 36 may have different widths in some embodiments.

The layers 34, 36 are dried, fired, or sintered paint. The paint may be formed from ink, such as ink deposited on the substrate 10. The paint may be sprayed onto the substrate 10. Any now known or later developed paints may be used. In alternative embodiments, one of the layers 34, 36 may be formed from other materials than paint, such as a metallic material such as used in CMOS or other semiconductor deposition processes.

The layers 34, 36 together should have a thickness such that the acoustic attenuation caused by such layers does not unduly diminish the acoustic performance of the touch screen. For example, the stack of layers 34, 36 is less than 50 microns thick to reduce or prevent acoustic attenuation in some embodiments. The layers 34, 36 are shown in FIG. 5 as having equal thicknesses. In alternative embodiments, the layers 34, 36 have different thicknesses with respect to each other. The layer 36 may be thinner, such as 5 microns or less, and the layer 34 may be thicker, such as 5-45 microns, or vise versa. The thickness of the stack or one or more layers 34, 36 may be different at different parts of the border 21.

As represented in FIG. 5, the multi-layer stack prevents viewing of at least the transducers 14 (not shown) and reflective arrays 22, 23 (not shown). The layers 34, 36 forming the stack are positioned on a back surface 11 of the substrate 10. The layer 34 closest to the substrate 10 is colored to provide a border 13 of the desired color. For example, the layer 34 is formed from white paint. The white paint layer 34 may be semi-transparent or opaque. To allow a thin layer 34 of the white paint, a layer 36 ("more opaque layer") of material that is more opaque than the thin layer 34 is added. The more opaque layer 36 is of a non-white color material that minimizes visual change of appearance in the perceived color of the layer 34. In preferred embodiments, the more opaque layer 36 is reflective or mirrored. More generally, layer 36 is reflective of light across a broad band of wavelengths (including at least a majority or all wavelengths of light visible to humans). In contrast to "reflective" of surface acoustic waves in relation to arrays 22 or 23 discussed above, the use of the term "reflective" in relation to layer 36 is intended to mean specularly reflective of light where has the light an angle of incidence that equals the angle of reflection off the layer (in contrast to diffusely reflective of light in multiple angles of reflection off the layer). The desired optical density of the stack including more opaque or reflective layer 36 is greater than about 2.0 in some embodiments, and greater than about 3.5 for other embodiments where there is back lighting used behind the border region of the touch substrate 10. Both layers 34, 36 together provide the desired color with a desired opacity but a thinner thickness overall for the border region for reducing surface acoustic wave attenuation.

The layer 36 is a mirror coating at the border 13, according to a specific embodiment. The coating 36 may be a mirror layer. Paint or ink with particles (e.g., flakes) of aluminum, platinum, or other reflective material is painted onto the border 13 or another layer 34. The coating 36 is fired or sintered, such as heating the coating to 200° C., 480° C., or other temperature according to some embodiments. The particles melt or combine to form a mirror layer. By firing or sintering the material 36, some or all of the carrier paint may evaporate.

The mirrored coating of the layer 36 is less than 3 microns thick in one embodiment. Greater or lesser thickness may be provided. The mirrored coating may be colored or otherwise contribute to the color of the border.

The layer 34 is a coating on the substrate 10, the other layer 36, or combinations thereof. The layer 34 is a colored coating. Any color may be used, such as white, yellow, red, or other lighter coating. In some embodiments where darker coatings, including black, are desired, the mirror coating 36 may allow the black coating to be thinner than if no mirror coating were used. Experiments have shown that layer 34 when black may be even thinner (on the order of between about 2 to about 10 microns thick) with increased opacity (optical density of around 2.0 or higher) and acceptable surface acoustic wave attenuation levels (e.g., on the order of about 0.3 dB/cm or less) if the color layer 34 is composed of submicron particles or nanoparticles that have small, generally uniform particle size (in contrast to if the layer is composed of particles having a generally non-uniform particle size) that might be formed by various known milling techniques or hydrodynamic atomization processes. The layer 34 provides color for the border 13. The color layer 34 may have thickness less than 50 microns thick, such as in one embodiment, but greater or lesser thickness may be provided depending on the wavelength of the acoustic waves being used. In some embodiments, the layer 34 may be formed from multiple colors, such as combinations of paints with different colors, consistencies, reflectivities, or other characteristics to achieve a desired look. For example, the layer 34 may be a rainbow array of colors or some combination of selected colors along the border region.

The layer 36 is blocked from view by the layer 34. The layer 36 may contribute to opacity of the border 13, blocking the view by a user of anything behind the border 13. The layer 34 is positioned between the substrate 10 and the layer 36. The layer 34 is closest to the user and is of a color and consistency desired for cosmetic purposes. The lower layer 36 contributes to the opacity and allows a thinner multi-layer stack for propagation of surface acoustic waves 18.

The transducer 14 is a known wedge transducer according to some embodiments that includes a piezoelectric element 30 and a wedge 28. The piezoelectric element 30 generates vibrations and the "wedge" material 28 (e.g., polymer or acrylic material) serves to couple the vibrations of the piezoelectric element 30 to surface acoustic waves 18 propagating on the touch substrate 10. The piezoelectric element 30 is any piezoelectric material and varying the potential of electrodes positioned on the piezoelectric material results in oscillating pressure waves being generated.

Figure 3:
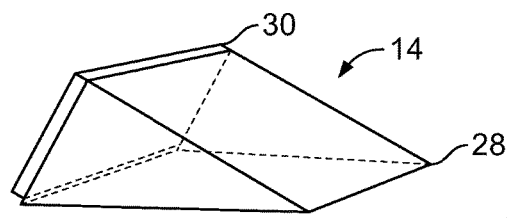
FIGS. 3 and 4 are perspective and side views of a conventional wedge transducer.
Figure 4:
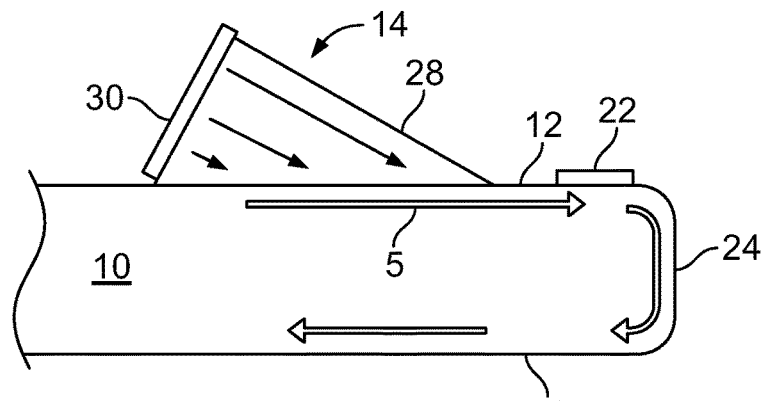

FIGS. 3 and 4 show an example of a conventional wedge transducer 14 for generating surface acoustic waves 18 that propagate in a direction represented by arrow 5 and that may be used in a touch sensor according to a specific embodiment of the invention. The piezoelectric element 30 mounted on the top back surface (also referred to as a first surface) of the wedge 28 generates bulk pressure acoustic waves, represented by rays, in the wedge 28. At the boundary surface of the wedge 28 that is on or in contact with the touch substrate 10, surface acoustic waves, represented by ray 5, are generated that propagate across the touch substrate 10. The surface acoustic waves are directed by reflective array 22 propagate on the touch surface 12 rather than through the surface 12, and thus propagate in a different direction than the pressure waves when considering propagation directions in a cross-sectional plane (such as the cross-sectional plane shown in FIG. 4). The angles on the touch surface 12 of propagation are the same as the associated directional components of the pressure wave vector (i.e., the surface acoustic waves have the same X and Y vector components or direction, but different Z direction where Z is into the surface 12 and X and Y are along the surface 12). The conversion between bulk and surface waves does not change the wave propagation direction in a plan view projection.

The transducer 14 generates surface acoustic waves in a beam or along a line. The beam edges of the generated surface acoustic waves are at a given level down from a peak, such as 3 dB, 6 dB, 10 dB or other level down. Alternatively, the beam edges are where the surface acoustic wave is sufficiently above a noise level to provide for reliable (99%) touch sensing.

In other embodiments, the transducer 14 does not include a wedge. For example, a grating generates surface acoustic waves in response to impinging waves transmitted through the touch substrate 10 from a piezoelectric element 30. As another example, a comb generates surface acoustic waves in response to waves transmitted from a piezoelectric element 30 in contact with the comb. In yet another example, a piezoelectric film with interdigital electrodes generates the surface acoustic waves.

In one embodiment, two or four transducers 14 are positioned near different corners of a rectangular touch surface 12. A rectangular touch region 16 is formed where touch locations may be detected due to interference with two surface acoustic wave propagation paths. Reflectors 22 and 23 may be provided for reflecting surface acoustic waves from the transducers 14, as discussed above.

The surface acoustic waves 18 propagate over at least a portion of the border 13. Since the border 13 is formed by the multi-layer paint stack, the surface acoustic waves propagate across the layers 34 and 36. The reflectors 22, 23 and transducers 14 are positioned on the multi-layered paint stack. The layers 34, 36 of paint prevent the user from seeing the reflectors 22, 23 and transducers 14.

Figure 6:
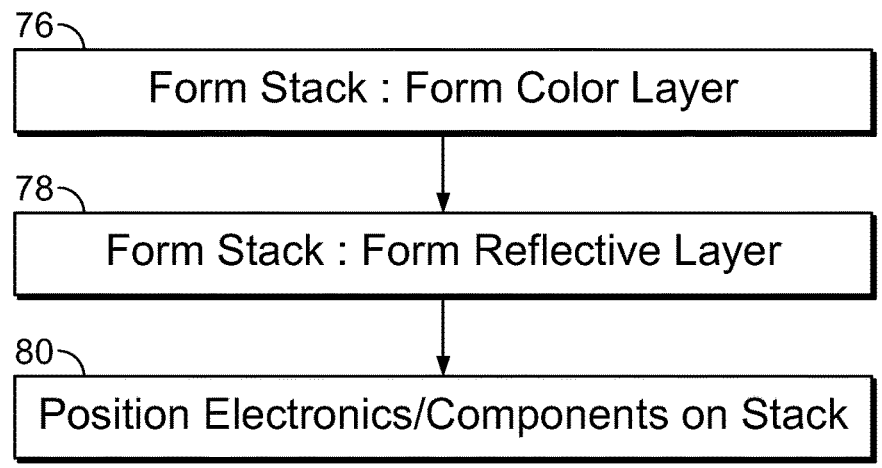
FIG. 6 is a flow chart diagram of one embodiment of a method for forming a surface acoustic wave touch sensor device configured to generate the waves in a desired pattern.

FIG. 6 shows a method for forming a surface acoustic wave touch device in accordance with the present invention. The method uses the substrate 10 with the border 13 of FIG. 1 or another arrangement. The method is implemented in the order shown according to a specific embodiment, but a different order may be provided in other embodiments.

In act 76, a color layer 34 serving as the cosmetic material is formed on back surface 11 of the touch substrate 10. The color layer is formed by deposition, placement, painting, spraying, or other act to position the layer. In act 78, a more opaque layer 36 such as a mirror or reflective layer is formed on the color layer 34. The layers 34 and 36 may be individually formed and then stacked, formed sequentially on the substrate, or formed together. In one embodiment, one layer 34 is first formed on the plate. After curing, drying, or firing, layer 36 is formed on the layer 34. Etching, masking or other processes may be used to shape the border and/or provide symbols or icons through at least one layer of the stack. Any combination of stacking, sintering, or other process may be used.

In one embodiment where the substrate is transparent glass, the cosmetic material, such as white paint, is deposited on a back surface 11 of the substrate. The cosmetic material forms a visual border viewable through the plate. To result in less attenuation, a mirror or other opaque material 36 is deposited over the cosmetic material 34. The mirror material is deposited as a slurry, liquid (e.g., paint or ink), or paste. The mirror material is deposited after the cosmetic material is dry or set. Alternatively, both layers are stacked prior to any or complete curing. Each layer or all the layers are sintered, such as heating to 200° C. or more.

The cosmetic material blocks the mirror material. The mirror material provides further opacity to the cosmetic material without or with minimal color distortion. Together, the layers are thinner than using the cosmetic material alone to provide a same level of opacity.

In act 80, the electronics/components (transducers, reflective arrays, etc.) of the acoustic touch sensor are positioned and bonded on the layered paint stack in border region 13 such that the surface acoustic waves travel in the desired pattern on the touch substrate. In one embodiment, the transducer is positioned on the stack prior to curing so that the curing bonds the transducer to the device. Alternatively, the transducer is separately bonded to the stack or the substrate. Other structures may be formed, connected to, or placed on or by the stack and/or the plate. One or more reflective arrays for directing surface acoustic arrays are positioned on the stack.

The surface acoustic waves propagate over at least part of the border region having the stack. Due to the multi-layered stack, attenuation caused by the border may be reduced as compared to a same level of opacity with a single layer of cosmetic material. The touches may be better detected while providing a light colored border.

In any of the embodiments discussed above, the surface acoustic waves may be Rayleigh or quasi-Rayleigh waves. Ultrasonic touch sensors using plate waves and Love waves rather than Rayleigh waves may be used in some embodiments.

The above description is intended to be illustrative, and not restrictive. The above-described embodiments (and/or aspects thereof) may be used in combination with one another. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. For example, use of the mirror layer in a paint stack formed in the border region may find some utility in other types of touch sensor devices such as surface acoustic wave sensors with acoustic touch components on the front surface of the touch substrate and covered by a bezel, or capacitive, resistive, acoustic pulse recognition or other touch devices. The scope of the invention should, therefore, be determined with reference to the appended claims, along with the full scope of equivalents to which such claims are entitled.

What is claimed:

1. A method for forming a surface acoustic wave touch device, the method comprising:
    forming a multi-layered material stack with a layer of opaque light reflective material over a layer of color material on a border region of a touch substrate; and
    positioning a transducer and an acoustically reflective array over the layer of opaque light reflective material in a configuration to propagate surface acoustic waves on the multi-layered material stack and the touch substrate.

2. The method of claim 1, wherein forming the multi-layered material stack comprises:
    depositing the layer of color material on the touch substrate,
    depositing the layer of opaque light reflective material directly on the color material, and
    sintering the multi-layered material stack.

3. The method of claim 1, wherein forming the multi-layered material stack comprises depositing the layer of color material as a white paint.

4. The method of claim 1, wherein positioning the transducer and the acoustically reflective array comprises placing the transducer and the acoustically reflective array directly on the layer of opaque light reflective material.

5. The method of claim 1, wherein the touch substrate comprises glass.

6. The method of claim 1, wherein the touch substrate defines a front surface and a back surface, and wherein the multi-layered material stack is formed on the back surface.

7. The method of claim 6, wherein positioning the transducer comprises positioning the transducer to propagate surface acoustic waves on the front surface over at least a portion of the border region.

8. The method of claim 7, wherein the touch substrate comprises a rounded connecting surface connecting the front and back surfaces, the surface acoustic waves propagating over the rounded connecting surface.

9. The method of claim 6, wherein the layer of color material is between the back surface and the layer of opaque light reflective material.

10. The method of claim 6, wherein positioning the transducer comprises placing the transducer on the layer of opaque light reflective material such that the multi-layered material stack prevents viewing of the transducer through the front surface.

11. The method of claim 1, wherein the layer of opaque light reflective material comprises a non-white layer.

12. The method of claim 1, wherein the layer of opaque light reflective material comprises a mirror layer formed from fired paint.

13. The method of claim 12, wherein the fired paint is formed with aluminum flakes.

14. The method of claim 1, wherein the multi-layered material stack is less than 50 microns thick.

15. The method of claim 1, wherein the multi-layered material stack comprises dried ink.

* * * * *